United States Patent [19]
Martin et al.

[11] Patent Number: 6,143,812
[45] Date of Patent: Nov. 7, 2000

[54] ASPHALT RELEASE AGENTS AND USE THEREOF

[75] Inventors: Eugene R. Martin, Onsted; Michael L. Coffey, Adrian, both of Mich.

[73] Assignee: Wacker Silicones Corporation, Adrian, Mich.

[21] Appl. No.: 09/139,471

[22] Filed: Aug. 25, 1998

[51] Int. Cl.$^7$ ........................................ C08J 1/12
[52] U.S. Cl. ................ 524/43; 524/45; 524/55; 525/101; 428/41.5; 428/41.8
[58] Field of Search .................. 524/43, 45, 55; 525/101; 428/41.5, 41.8

[56] References Cited

U.S. PATENT DOCUMENTS

| | | | |
|---|---|---|---|
| 4,078,104 | 3/1978 | Martin | 427/387 |
| 4,151,344 | 4/1979 | Doss et al. | 528/34 |
| 4,172,811 | 10/1979 | Sanford et al. | |
| 4,347,333 | 8/1982 | Lohr et al. | 524/269 |
| 4,447,500 | 5/1984 | Ferris | 428/489 |
| 5,108,782 | 4/1992 | Reed | |

FOREIGN PATENT DOCUMENTS

| | | |
|---|---|---|
| 0 541 311 A1 | 5/1993 | European Pat. Off. |
| WO 92 04 409 A1 | 3/1992 | WIPO |

OTHER PUBLICATIONS

Patent Abstract of Japan, JP 09111288, Apr. 28, 1997.

*Primary Examiner*—Nathan M. Nutter
*Attorney, Agent, or Firm*—Brooks & Kushman P.C.

[57] ABSTRACT

Asphalt release coatings are prepared by applying an aqueous emulsion containing an organopolysiloxane component, an effective amount of one or more emulsifying surfactants, and most minor amount of a multiple release additive. The compositions exhibit improved release, particularly multiple releases, even with polymer modified asphalt binders.

33 Claims, No Drawings

ASPHALT RELEASE AGENTS AND USE THEREOF

TECHNOLOGICAL FIELD

The present invention pertains to asphalt release compositions. More particularly, the present invention is directed to aqueous asphalt release compositions and their use in coating surfaces which are to be exposed to hot asphalt or other bituminous materials, from which easy release of the asphalt is desired.

BACKGROUND OF THE INVENTION

Asphalt and other like bituminous substances, whether of natural or synthetic origin (i.e., petroleum residue, coal tar residue, etc.), are widely used for applications such as roofing, waterproofing, and in particular, for paving applications where the asphalt is mixed with a variety of aggregates. During application of asphaltic substances, the same characteristics (e.g. tack), which give to asphalt its desirable application properties, also create significant problems with respect to release of these substances from truck beds, paving machines, shovels and other tools, and pressure rollers. These problems have been exacerbated recently by asphalt compositions containing polymeric modifiers which yet further increase adherence of hot asphalt to metal surfaces.

In the past, petroleum oils such as diesel fuel have been applied to truck beds, shovels, and the like to facilitate asphalt release. However, diesel fuel, when used for such applications, is now viewed as environmentally suspect. Moreover, the release effected by diesel fuel decreases over time, i.e. during lengthy trips from the asphalt source to the paving project, and incorporates the diesel fuel into the asphalt, where it can cause local soft spots, particularly upon later migration to the surface of the pavement under the influence of heat and light. Thus, diesel fuels are no longer recommended for use as asphalt release coatings.

U.S. Pat. No. 4,078,104 discloses asphalt release coatings which employ polydialkylsiloxanes such as polydimethylsiloxane, and which additionally contain from 0.1 to 90 percent by weight of aminofunctional silanes or siloxanes. The compositions may be applied neat by special spray apparatus, or dissolved in organic solvent such as naphtha. These compositions provide excellent release properties, but are expensive. Neat application requires special spray equipment, while application from solvent-containing solutions is now environmentally unacceptable.

U.S. Pat. No. 5,494,502 employs emulsions of a fatty oil derived from animal or vegetable sources, such as soybean oil, tung oil, linseed oil, olive oil, and the like, along with a surfactant which allows the oil to be dispersed in water. A crosslinked copolymer is an optional ingredient. However, the preferred method of application is by foaming with a special foaming apparatus, which severely limits ease of application. Moreover, the release characteristics are quite limited. Once water has evaporated from the formulation, the fatty oils soften the bitumen, causing the asphalt to adhere aggressively to truck beds after one initial release.

A further requirement for commercially acceptable asphalt release compositions is that they are suitable for use shortly after application. This is particularly true of aqueous emulsions due to the much slower evaporation of water as compared to volatile organic solvents, which are, in general, no longer used. Compositions which provide effective release only after extended drying periods are not suitable for use as asphalt release compositions.

It would be advantageous to provide a means of treating surfaces with asphalt release compositions which are environmentally acceptable, which can be applied without the use of organic solvents and without specialized equipment, and which provide for multiple releases from the substrate.

SUMMARY OF THE INVENTION

It has now been surprisingly discovered that asphalt release compositions can be prepared which may be provided in the form of aqueous emulsions and which exhibit multiple release properties. These emulsions contain an organopolysiloxane component, a dispersing and/or emulsifying surfactant, and a multiple release additive selected from the group consisting of inorganic and organic thickening agents.

DESCRIPTION OF THE PREFERRED EMBODIMENTS

The asphalt release agents of the present invention are aqueous emulsions or dispersions as hereinafter defined, which are especially effective as release coatings for various bituminous materials such as asphalts, bitumen, tars and pitches. The term "bituminous materials" includes not only "asphalt" and "asphaltic compositions" but also include liquid or semi-liquid residues obtained from the destructive distillation of non-asphaltic petroleum, from the distillation of semi-asphaltic and asphaltic petroleums, from the distillation of pressure tar, from the distillation of the residue resulting from the thermal and catalytic cracking of petroleum and from the mixing of harder residual asphalts with heavy distillates. Generally, these asphaltic compositions may be characterized as having a penetration value at 77° F. of from about 1 to about 300 mm/10 (ASTM D-5-59-T) and a softening point of from about 100° to about 344° F. (ASTM D-36-26).

These bituminous materials may also include aggregate materials such as rocks and stones which are mixed therewith and applied as hot or cold laid aggregate-asphalt mixes. These asphalt aggregates may be used in the constructions of hard surfaces such as pavements, driveways and the like. The release composition may be applied as a film to paper, plastic, metal, or other substrates expected to contact asphaltic compositions, by any conventional method known in the art such as by brushing, spraying or dipping in a conventional coating device.

The release compositions of the subject invention contain an organopolysiloxane component; amounts of ionic, zwitterionic, or non-ionic surfactants effective to ensure that a stable or redispersible emulsion or dispersion may be obtained; and a multiple release additive ("MRA") selected from the group of inorganic and organic thickening agents. The compositions may include other ingredients such as organic oils and waxes, bacteriocides, mildewcides, antifoams, and corrosion inhibitors. The emulsions may be supplied as an end-use emulsion ready to be applied to the surface in question without further dilution, as an extendable emulsion, or as a concentrate. The latter two forms of the composition will contain amounts of ingredients necessary to form the ready-to-use emulsion upon proper dilution with water-containing fluids.

The ready-to spray formulation will preferably include from about 1.0 to about 30 weight percent organopolysiloxane component, more preferably from about 5 to about 20 weight percent, and yet more preferably about 15 to 20 weight percent. The actual amount will be dictated by the nature of the organopolysiloxanes and by the number of releases which are required. Naturally, compositions employing lesser amounts of organopolysiloxanes are somewhat less expensive to manufacture.

The organopolysiloxane component may comprise but a single organopolysiloxane, or may comprise a mixture of organopolysiloxanes. The organopolysiloxanes may bear functional groups as long as stable dispersions may be obtained. The organopolysiloxanes may be substantially linear, may be branched, or may be resinous, and in general are formed of units having the formulae $R_3SiO_{1/2}$ (M units); $R_2SiO_{2/2}$ (D units); $RSiO_{3/2}$ (T units); and $SiO_{4/2}$ (Q units). Organopolysiloxanes containing T and Q units are branched; those containing large amounts of T and Q units are organopolysiloxane resins.

In the above formulae, R may be selected from $C_{1-18}$ hydrocarbon radicals, both saturated and unsaturated, and both substituted and unsubstituted. Examples of saturated hydrocarbon radicals include methyl, ethyl, n-propyl, 2-propyl, butyl, cyclohexyl, n-octyl, n-decyl, and n-octadecyl and the like, preferably $C_{1-4}$ hydrocarbon radicals, and most preferably methyl radicals. Examples of unsaturated hydrocarbon radicals include vinyl, allyl, propenyl, ω-hexenyl, and the like. Organopolysiloxanes containing unsaturated R groups, due to their increased expense relative to saturated radical-containing organopolysiloxanes, are not preferred.

Examples of substituted hydrocarbon radicals include halogen substituted, cyano-substituted, alkoxy-substituted, and hydroxyl-substituted radicals, for example chloromethyl and 2-chloroethyl radicals, 2-cyanoethyl radicals, perfluoropropyl and trifluoromethyl radicals, and the like. Suitable substituents are well known to the those skilled in the art, and all substituents which do not prevent the maintenance of a stable emulsion, and which do not interfere with the release properties of the composition, may be used. The $C_{1-18}$ substituted and unsubstituted saturated and unsaturated hydrocarbons may also contain interspersed heteroatoms, especially those of —O—, —S—, and —NH—. R may also be a $C_6$–$C_{30}$ aryl, alkaryl, or aralkyl radical, for example phenyl, naphthyl, phenanthryl, chlorophenyl, phenylethyl, benzyl, or the like. The aryl radicals, like the saturated and unsaturated hydrocarbon radicals, may optionally be substituted.

R may also be hydroxyl, hydrogen (not preferred), $C_{1-8}$ alkoxy, mercapto, mercaptoalkyl, amino, aminoalkyl, and the like. Preferred aminoalkyl groups include aminopropyl, aminoethylaminopropyl, morpholino, pyridinyl, and the like. Preferred alkoxy groups are methoxy and ethoxy groups. The organopolysiloxanes may also contain alkylene linking groups in the organopolysiloxane chain, as well as oligomeric or polymeric polyoxyalkylene linking groups, such that the organopolysiloxane contains

linking groups where $R^1$ is a $C_{1-18}$ alkylene group or a polyoxyalkylene group such as O—$(R^1$—O$)_n$ or —$(R^1$—O$)_n$ group or the like, where $R^1$ is preferably a $C_{1-18}$ alkylene group, more preferably a $C_{2-4}$ alkylene group. $R^1$ may also contain interspersed heteroatoms of nitrogen or sulfur.

Preferred organopolysiloxanes used for the organopolysiloxane component include hydroxyl-functional, mercapto-functional, and amino-functional organopolysiloxanes whose non-functional R groups are predominately methyl groups. Examples of preferred organopolysiloxanes are trimethylsilyl-terminated polydimethylsiloxanes, dimethylsilanol-terminated polydimethylsiloxanes, mercaptoalkyldimethylsilyl-terminated polydimethylsiloxanes, and aminoalkyldimethylsilyl-terminated polydimethylsiloxanes. Polydimethylsiloxanes with pendant mercaptoalkyl, hydroxyl, aminoalkyl groups or silyl or siloxy groups containing mercapto, hydroxyl, or aminoalkyl groups are also preferred.

Organopolysiloxane resins preferably may constitute no more than 40 weight percent of the organopolysiloxane composition, the remainder being organopolysiloxane fluids. Examples of resinous organopolysiloxanes may be found in Noll, CHEMISTRY AND TECHNOLOGY OF SILICONES, pages 409–426, Academic Press, New York, © 1968. Silicone fluids and silicone resins useful in the practice of the invention are commercially available in both neat and emulsion form. Examples are silicone emulsions designated E209, SWS 237, E60 350 and E60 1000, available from Wacker Silicones, Adrian, Mich. The latter two emulsions contain about 60 weight percent of trimethylsilyl-terminated polydimethylsiloxanes having viscosities of 350 cSt and 1000 cSt, respectively, and a blend of non-ionic surfactants. SWS 237 is a 35 weight percent emulsion of a 60,000 cSt fluid emulsified with the aid of non-ionic surfactants. E209 is a 35 weight percent blend of trimethylsilyl- and aminoalkyl-functional polydimethylsiloxanes. Organopolysiloxane emulsion E37, containing 35 weight percent silicone stabilized by both non-ionic and anionic surfactants, also available from Wacker Silicones, is also suitable. E37 contains a mixture of MQ resin and trimethylsilyl-terminated polydimethylsiloxane.

The preferred silicone emulsions are the emulsions containing a mixture of mercaptoalkyl-functional silicone fluid and a dimethylpolysiloxane fluid. These emulsions are preferred because they provide the most economical formulation, provide multiple releases after a single application of release emulsion, provide the most consistent release over a broad system of usage conditions. The aminofunctional materials provide excellent release, but may require personal respiratory protection, particularly if used in confined spaces. The amount of aminofunctional fluid can be minimized to reduce any health hazards, but release properties are then compromised. The MQ resin-containing emulsions are more expensive than the mercaptoalkyl-functional silicone compositions, but provide multiple releases after a single application of release emulsion. The emulsions of nonfunctional silicones containing a MRA provide multiple releases after a single application of release agent but are inferior, in and of themselves, to the functionalized siloxane fluids and MQ resin-containing emulsions. Compositions containing combinations of liquid organopolysiloxanes, particularly those having silanol and mercaptoalkyl functionality, and up to about 40 weight percent silicone resin, based on the total weight of the organopolysiloxane component, are highly suitable.

The organopolysiloxane must be stably emulsified or dispersed. As used herein, the term "emulsions" shall include "dispersions". It should be noted that organopolysiloxane resins are generally solids. The formulations may contain solid particulate resins dispersed therein, but most commonly will include resins having been first dissolved in the silicone fluid portion of the organopolysiloxane component. As a result, the silicone resins, despite being solids, are present in emulsified form. The term "emulsion" further includes microemulsions.

In order to prepare the emulsions of the subject invention, which are oil-in-water emulsions, an effective amount of one or more emulsifying surfactants must be present. Suitable surfactants include all categories of surfactants, including non-ionic, cationic, anionic, amphoteric, zwitterionic, etc. Mixtures of different compatible classes of surfactants may be used. Non-ionic surfactants, and mixtures of non-ionic and ionic surfactants are preferred.

Suitable non-ionic surfactants include polyoxyalkylene surfactants such as polyoxypropylene/polyoxyethylene block copolymers and block/random copolymers available from BASF Corporation under the trade name Pluronic® surfactants and Tetronic® surfactants. Also suitable, and preferred, are polyoxyalkylene surfactants prepared by oxy-alkylating a monofunctional, oxyalkylatable hydrocarbon starter molecule such as an aliphatic alcohol, phenol, alkylphenol, fatty acid or amide, or the like. Blends having an HLB of 12 are particularly suitable. Particularly preferred are oxyethylated alkanols and alkylphenols such as the 3 to 20 mole oxyethylates, preferably 3 and 12 mole oxyethylates of alkanols such as n-butanol, n-octanol, 2-ethylhexanol, and the like, and alkylphenols such as nonylphenol and octylphenol. Suitable surfactants in the latter categories are available from numerous sources, such as the Tergitol® surfactants available from the Union Carbide Corporation, and the Genepol® surfactants available from Hoechst. Further examples of suitable non-ionic surfactants may be found in the treatise NON-IONIC SURFACTANTS, Martin Schick, Ed., Marcel-Dekker.

The surfactants must be present in an emulsifying effective amount, this amount being dependent somewhat on the nature and efficiency of the surfactant, but generally in amounts of from about 0.4 weight percent to about 7.5 weight percent, more preferably about 0.6 weight percent to about 2 weight percent. Ethoxylated fatty alcohol surfactant blends having an HLB of 12 in amounts of about 1.1 to 1.5 weight percent are advantageously used. Although stable (non-separating or segregating) emulsions are preferred, emulsions which separate wholly or partially but which are easily redispersible by simple mixing are also useful.

A multiple release additive ("MRA") is a necessary ingredient. A "multiple release additive" is an additive which, when added to the organopolysiloxane emulsions described above, causes an increase in the number of releases of release composition when tested as disclosed herein. Components which are multiple release additives as defined herein are also limited to those ingredients which, when added to a 20 weight percent aqueous emulsion of a 350 cSt trimethylsilyl-terminated polysiloxane in amounts of 5 weight percent (based on MRA solids) or less, cause the viscosity of the silicone emulsion to rise to greater than 100 cSt. Suitable MRAs fall preferably within the class of efficient inorganic and organic thickeners which are effective to increase the viscosity of 10–25 weight percent organopolysiloxane emulsions to the range of 500–4000 cSt, more preferably 750–3000 cSt, and most preferably 1000–2000 cSt, at use levels of 0.01 weight percent to about 10 weight percent, more preferably 0.03 weight percent to about 2 weight percent, and most preferably 0.05 weight percent to about 0.5 weight percent.

If the viscosity of the release composition is higher than about 4000 cSt, spraying may be rendered more difficult. This is particularly true at viscosities in the range of 10,000 cSt and higher. However, such compositions may be applied by wiping, etc., and are thus particularly suitable for application to shovels and like tools. If the amount of MRA required to achieve the desired viscosity is higher than 10%, then the cost of the release composition will be compromised. Moreover, at use levels in excess of about 2 weight percent, significant interaction with the asphalt is possible, and the effects of such interaction will have to be determined.

Suitable inorganic MRAs include magnesium aluminum silicates, fumed silica, and clays such as bentonite, etc., which have a pronounced thickening effect. Amounts of such inorganic MRAs which are useful are, in general, somewhat higher than the organic MRAs, and may suitably be from about 0.2 weight percent to about 5 weight percent, preferably 0.5 weight percent to about 3 weight percent. it is noted that these MRAs are solids, and will be present in the release composition emulsions in dispersed form.

Preferably, organic MRAs are used. The organic MRAs may include natural, synthetic, and chemically modified natural thickeners. Examples of natural and chemically modified natural MRAs are the various vegetable gums, i.e. tragacanth gum, arabic gum, carrageenan gum, guar gum, xanthan gum, alginates such as sodium alginate, celluloses and starches, carboxylalkyl, hydroxyalkyl- and alkyl-modified cellulose ethers such as methylcellulose, propylcellulose, carboxymethylcellulose, hydroxypropylcellulose, and the like.

Preferred MRAs are synthetic organic polymers which exhibit high thickening efficiency. Such polymers include polysulfonic acids and other polymers having hydrophillic group-containing repeating units, but are preferably the various polyacrylic acids and polyacrylates, e.g. those available under the trade names Carbopol® (B.F. Goodrich) and Acrysol® (Rohm and Haas). Also suitable are high molecular weight soluble polyoxyethylene glycols, and associative polyether thickeners such as those described in U.S. Pat. Nos. 4,665,239 and 4,354,946. Preferred are polymers and copolymers based on acrylic acid, acrylate esters, acrylamide, modified acrylamides, and the like. Amounts of the more efficient of such thickeners which are effective range from 0.01 to 0.1 weight percent. The polyacrylate thickeners may be present in solution form in the continuous phase, as an emulsion or dispersion, or both in dissolved as well as dispersed form. It is preferable that the MRA be hydrophilic, and even hygroscopic. While not willing to be bound to any particular theory, it is believed that the MRAs perform by firstly preventing rapid runoff from the surface to be treated, and secondly, and most importantly, delaying evaporation of water from the composition. The MRA also unexpectedly improves the release properties of silicone release films in the absence of water, by allowing for more releases than the silicone provides singularly.

By the term "polyacrylate polymers" as that term is used herein is meant the polymers and copolymers of acrylic acid and acrylic acid derivatives such as those described above, but not limited thereto. Included in the term "organic thickeners" are also polymers of other unsaturated carboxylic and di- and polycarboxylic acids and their derivatives, such as maleic anhydride, maleic acid, itaconic acid, fumaric acid, and the like. These monomers, as well as acrylic acid and acrylates, may be copolymerized with other unsaturated monomers such as ethylene, vinylchloride, styrene, propylene, and the like. The term "polycarboxylic acid polymer or copolymer" includes homopolymers of unsaturated mono-, di-, and polycarboxylic acids and copolymers containing more than one unsaturated carboxylic acid monomer and/or their derivatives such as esters, amides, and the like.

In addition to the required organopolysiloxane component, emulsifying surfactant, and MRA, the compositions of the subject invention may include antifoamers, biocides, mildewcides, etc. In addition, the formulations may contain minor amounts, on a solids basis, of organic waxes, e.g. in the form of aqueous dispersion; mineral oils, vegetable oils, and the like. Dispersions of polyisobutylene oligomers may also be added. Unlike the prior art compositions in which the release agent active ingredient is essentially a fatty oil, with all the drawbacks of the latter as previously discussed, in the present invention, most minor amounts of relatively inexpensive vegetable oil and the like can be used to extend the non-aqueous phase composition. These small amounts, less than 30% of the weight of total solids, preferably less than 20% of total solids, will, due to their smaller usage, not have the disadvantages of release agents solely based on these materials. Preferably, however, oils such as vegetable or fatty oils constitute less than 10% by weight of total solids, and are preferably absent from the composition.

Concentrates which may be diluted to sprayable compositions are also within the scope of the invention. The upper compositional limit of such concentrates is generally set by the maximum organosiloxane content which is commercially feasible, i.e. about 60 weight percent. The remaining ingredients should be present in proportion to the silicone content. For example, for a sprayable compositioncontaining 20% silicone, 1.5% emulsifier, and 0.1% MRA, two suitable concentrates might consist of 40% silicone, 3% emulsifier, and 0.2% MRA; and 60% silicone, 4.5% emulsifier, and 0.3% MRA; to be diluted by factors of 2 and 3, respectively. The amounts of emulsifier and MRA may have to be adjusted to obtain stable concentrates.

The pH of the asphalt release agent compositions is preferably slightly higher than 7, preferably between 8 and 9, when they are to be applied to iron or steel substrates. The pH is preferably adjusted by addition of mild organic bases such as diethanolamine and triethanolamine. However, inorganic bases, i.e. alkali metal hydroxides, or ammonia may be used as well. Combinations of such bases are also useful.

Having generally described this invention, a further understanding can be obtained by reference to certain specific examples which are provided herein for purposes of illustration only and are not intended to be limiting unless otherwise specified.

In the Examples which follow, an asphalt binder AC 10, 143° C., is poured onto metal panels. The AC10 binder is a 50/50 wt/wt mixture of AC5 and AC20, also containing 4.3 weight percent of a polymer modifier designated Butanol NS® 175 supplied by BASF. The polymer modified asphalt binder is employed in testing since it exacerbates release problems.

COMPARISON EXAMPLE C1

To a 16 Ga. cold rolled 12×12 inch steel panel is applied 11.25 g of a commercial asphalt release agent, "Black Magic for Rubber", believed to consist of fatty oils. NMR analysis shows it to be an organic release agent consistent with the fatty oil description. Evaporation of the volatile constituents of a sample of the product in an oven reveals that the solids content (oven "solids" or non-volatiles) is approximately 20 weight percent. A trigger spray bottle is used to apply the release agent emulsion. The panel is weighed immediately after the application, and then allowed to sit for 5 minutes and weighed again. 5.1 g, 45.3% of initial material applied, remains on the panel after five minutes. 20 g of the AC10 asphalt binder, 143° C., is poured on the center of the panel. The asphalt is allowed to cool and then one edge is lifted with a spatula. The lifted edge is pulled by hand with a continuous motion. 100% of the asphalt is removed and 20 g of hot asphalt is applied to the same area and the procedure repeated. About 99.5% of the asphalt is removed the second time. The procedure is repeated a third time, however none of the asphalt can be removed. The panel is allowed to sit overnight to allow remaining water to evaporate more completely. 20 g of an AC10 asphalt binder, 143° C., is poured on an unused area. All the asphalt is removed. The procedure is repeated again, however the asphalt can no longer be removed. The still "wet", i.e. water-containing coating provides for two releases, while the dry panel provides for only one release.

The Black Magic for Rubber is applied to a second panel, 14.1 g, and the panel is placed in an oven heated at 50° C. for three hours. The panel is allowed to cool and then 20 g of an AC10 asphalt binder, 143° C., is poured on the center of the panel. The procedure above for removal of the asphalt binder is repeated and 99% of the asphalt is removed. Asphalt binder is applied again to the same area and only 25 percent of the asphalt is removed. The relative humidity is less than 40%.

COMPARISON EXAMPLE C2

A mixture consisting of five percent of a 60% silicone emulsion of a mercaptan-functional silicone fluid and 95% water is applied to a panel as described above, in an amount of 9.2 g. The mercaptan-functional silicone fluid contains about 1 weight percent SH groups and has a neat viscosity of about 80 cSt. The emulsion has a viscosity similar to water. The panel is allowed to dry for five minutes and 2.5 grams of the diluted emulsion remains. The asphalt binder described in Comparison Example 1 is applied following the procedure described above. One good release is obtained. The panel is allowed to dry thoroughly in air, and the asphalt is applied to a new area following the procedure described above. Three releases are obtained on the dried panel.

The above procedure is repeated, except that 16.7% of the 60% silicone emulsion of mercaptan-functional silicone fluid and 83.3% water is applied to a panel described above. The same result is obtained. The relative humidity is less than 40%.

COMPARISON EXAMPLE C3

The polymer modified asphalt used in Comparison Example C1 is applied to an untreated metal panel following the procedure described in Comparison Example C1. The asphalt from the first application could not be removed.

COMPARISON EXAMPLE C4

A 3.5% aqueous solution of Carbopol® 981 polyacrylic acid polymer is prepared and neutralized with triethanolamine and ammonium hydroxide. The solution has a viscosity of 2200 Cps. The solution is applied to a cold rolled steel panel and its release properties are determined according to the procedure of Comparison Example C1, at a relative humidity of 78%. Three releases are obtained on the panel using the five minute dry method. No releases are obtained on a treated panel that is previously dried.

EXAMPLE 1

An asphalt release composition is prepared by mixing 16.7 parts of the mercaptan-functional silicone emulsion described in Comparison Example C2, 83.3 parts of water, 0. 1 parts Carbopol® 940 polyacrylate and 0. 1 parts triethanolamine. Of the 13.9 g of this formulation sprayed on the panel, 5.9 g remained after five minutes. Asphalt binder is applied following the procedure as described in Comparison Example C 1. Two releases are obtained compared to one release in Comparison Example C2. The percent solids contained in the release coating is only about half the percent solids present in the Black Magic for Rubber product employed in Comparison Example C1. The relative humidity is less than 40%.

EXAMPLES 2A–E AND COMPARISON EXAMPLES C5 A–E

To cold rolled steel panels are applied individually (A) a methyl-terminated polydimethylsiloxane, (B) a blend consisting of 10% by weight aminoethylaminopropylfunctional-polydimethylsiloxane and 90% trimethylsilyl-terminated dimethylpolysiloxane, (C) a blend consisting of 25% MQ resin and 75% trimethylsilyl-terminated polydimethylsiloxane, (D) a blend consisting of 5% 3-mercaptopropyl-functional silicone used in Comparison Example C2 and 95% of a dimethylsilanol-terminated polydimethylsiloxane having a neat viscosity of 6000 cSt and (E) a dimethylsilanol-terminated polydimethylsiloxane having a viscosity of 6000 cSt. Hot asphalt binder AC10, provided by Industrial Laboratories located in Fort Worth, Tex., is applied to each panel and the release properties are determined. Table 1 shows the results.

TABLE 1

| Silicone | Number of Releases |
| --- | --- |
| A | 1 |
| B | 3 |
| C | 3 |
| D | 3 |
| E | NT |

An emulsion of each of the above organopolysiloxane compositions was prepared using non-ionic emulsifiers having an HLB of 12. A Turrax mixer is used to facilitate making the emulsions. The emulsions are prepared at 60% silicone, and diluted with water, 2 parts of water to one part emulsion. A sample of each diluted emulsion is thickened with Carbopol® 981 polyacrylate to a viscosity of about 2000 cPs. The B silicone emulsion is made at 35% silicone. It is diluted with water, 2.5 parts to 1 part emulsion, and thickened with the Carbopol® 981 to also provide a viscosity of about 2000 cPs. The unthickened emulsions and thickened emulsions are applied to cold rolled steel panels and their release properties determined following the procedure of Comparison Example C1 except that the panels are dried two hours in the sunlight outdoors. The relative humidity is 78%, except for the second trial of composition A, where the relative humidity was 61%. The results are presented in Table 2.

TABLE 2

| | NO MRA (Comparative) | | CONTAINS MRA | |
| --- | --- | --- | --- | --- |
| Silicone | Releases After 5 Minute Dry Period | Releases After 2 Hour Dry Time | Releases After 5 Minute Dry Period | Releases After 2 Hour Dry Time |
| A | 1 | 3 | 3 | 5 |
| A[1] | 1 | 1 | 4 | 5 |
| B | 3 | 3 | 4 | 3 |
| C | 2 | NT | 3 | NT |
| D | 2 | NT | 4 | >10 |
| E | NT | NT | 3 | 5 |

[1]Measured at 61% relative humidity.

The results in Table 2 indicate that when the MRA is present, the number of releases is markedly increased, particularly after only a short drying time, which is necessary for a commercially acceptable asphalt release composition. A further panel is treated with the (A) containing emulsion but no MRA and the panel is dried in an oven at 50° C. overnight. Only one release is obtained. Release performance of compositions containing no MRA are greatly affected by differences in humidity.

EXAMPLE 3

An emulsion containing 20% of the silicone in Comparison Example C2 and 0.075% Carbopol® 940 is sprayed on an aluminum panel and allowed to dry five minutes. The panel is only treated in a small area using a squirt bottle with a trigger sprayer. Three squirts are used, about 3 grams. Asphalt binder AC 10, 20 grams, as described in Comparison Example C1 is used to determine release properties. Greater than 3 releases are obtained. Another panel is treated and allowed to dry overnight. Again, three releases are obtained. The relative humidity is less than 40%.

EXAMPLE 4

The (D) composition of Example 2 is mixed with several different additives and their release properties on steel panels are determined by spraying the release formulation on a small area of the panel. The release agent is applied from a spray bottle having a trigger sprayer. Two squirts per area, 3×3 inches. The treated panel is allowed to dry for 5 minutes and then 5 grams of the AC10 asphalt binder used in Example 2 is applied, and release performance is determined as above. Table 3 shows the results. Relative humidity is 58%. The procedure is repeated except the panels are placed in an oven for two hours at 60° C. after application of the release emulsion candidate, following which the panel is cooled to room temperature, and the hot asphalt binder applied. The results are also shown in Table 3.

TABLE 3

| Percent Silicone in Diluted Emulsion | MRA Commercial Name | MRA Identity & Concentration % | Viscosity cPs #2 Spindle @ 10 Model RVT | Base Identity & Concentration % | # of Releases (5 min dry time) | # of Releases (2 hours @ 6° C.) |
| --- | --- | --- | --- | --- | --- | --- |
| 20 | Hercules 7M | Carboxymethyl cellulose/2.33 | 2160 | Triethanol amine/.67% | 3 | 4 |
| 20 | Viscarin GP209 | Carrageenan/.5 | 2000 | Triethanol amine/.5 % | 2 | 4 |
| 20 | Rheothik 80-11 | Polysulfonic acid/7.1 | 2000 | Triethanol amine/.5% | 5 | 2 |

TABLE 3-continued

| Percent Silicone in Diluted Emulsion | MRA Commercial Name | MRA Identity & Concentration % | Viscosity cPs #2 Spindle @ 10 Model RVT | Base Identity & Concentration % | # of Releases (5 min dry time) | # of Releases (2 hours @ 6° C.) |
|---|---|---|---|---|---|---|
| 20 | Kelzan ® S | Xanthan gum/0.5 | 2200 | Triethanol amine/.5% | 3 | 7 |
| 20 | Bentone ® MA | Magnesium Aluminum Silicate/2.4 | 2440 | Triethanol amine/.5% | 2 | 4 |

The results in Table 3 indicate that a wide variety of organic and inorganic thickeners are useful as MRAs.

EXAMPLE 5

An emulsion containing MRA, about 1000 ml, and containing the silicone (D) of Example 2, is dried in vacuum at 60° C. About 100 mls of the resulting residue is poured over 50 grams of hot asphalt mixture consisting of 6.2% of the asphalt binder AC10 used in Comparison Example 1, 56.3% of #8 stone and 37.5% sand. The emulsion residue did not dissolve the asphalt mixture nor did it strip the binder from the aggregate. The liquid layer became slightly discolored, yellow. The thickened emulsion with the silicone (D) of Example 2 is poured over the asphalt aggregate mixture described above. After two weeks, the asphalt is not stripped from the aggregate nor is the emulsion discolored.

COMPARISON EXAMPLES C6 and C7

The procedure of Example 5 was repeated with Black Magic for Rubber produced by Chemark, volatiles having been removed under vacuum. Within a few minutes, the liquid layer contacting the asphalt became black and after several hours the asphalt binder was stripped from the aggregate. The procedure is repeated with diesel fuel and the asphalt is stripped from the aggregate very quickly.

EXAMPLE 7

Several gallons of the release emulsion made with silicone (D) and thickened with Carbopol 981 to a viscosity of about 2000 cPs is submitted to the Texas Department of Transportation, Materials and Test Division. It is tested using the TEX-239-F-006 test method. The product passes the test including the field test, which includes tools and truck beds. The Texas Department of Transportation test is a relatively stringent test; as of April 1997, of 39 candidates supplied in amounts suitable for testing, only 6 were accepted for general use, with two accepted for use in truck beds only. One of these was Black Magic for Rubber. As can be seen herein, the subject compositions clearly outperformed the latter in laboratory evaluations.

EXAMPLE 8

To show that the thickener slows the evaporation rate about 0.5 grams of the emulsion containing the (D) silicone, as disclosed in Example 2, and diluted 2/1 (water/emulsion) is placed in an aluminum dish and is allowed to evaporate. Weight loss with time is determined and is shown in Table 4. The experiment is repeated except thickener, Carbopol® 981 is added to thicken the emulsion to about 2000 cPs. Table 4 shows the results. Temperature was 70° F. and relative humidity was 38%. Percentages in table are percent weight loss for that time of evaporation.

| Time Minutes | No Thickener | Thickener |
|---|---|---|
| 5 | 7.3% | 3.4% |
| 15 | 18.5% | 8.1% |
| 30 | 34.9% | 14.9% |
| 45 | 49.7% | 22.0% |
| 60 | 64.0% | 29.2% |

By "solids" is meant oven solids or non-volatile components. These components are essentially the non-aqueous components, and are both liquids (i.e. organopolysiloxane fluids), and solids (i.e. organopolysiloxane resins, polyacrylates, etc.) The oven solids test is well known to those skilled in the art, and the term "solids" is used even when some or all of the non-volatiles are liquids. By the term "major" if used herein, is meant 50% or greater by weight, and by the term "minor" is meant less than 50% by weight. The ingredients necessary to the present formulation are an organopolysiloxane component, an emulsifier component, and an MRA. These components may be used to the exclusion of ingredients not indicated as necessary ingredients herein. Named ingredients such as particular surfactants, MRAs, etc., can be used to the exclusion of other named ingredients and to the exclusion of ingredients not named or discussed herein.

Having now fully described the invention, it will be apparent to one of ordinary skill in the art that many changes and modifications can be made thereto without departing from the spirit or scope of the invention as set forth herein.

What is claimed is:

1. A process for the formation of an asphalt release-coating on a substrate, said process comprising applying to said substrate an aqueous asphalt release coating emulsion comprising, in weight percent based on the weight of the emulsion:
   a) from about 1 to about 30 percent of an organopolysiloxane component;
   b) an amount of one or more surfactants effective to form a stable aqueous emulsion of said organopolysiloxane component; and
   c) from about 0.01 percent to about 10 percent of a multiple release additive.

2. The process of claim 1 wherein said organopolysiloxane component comprises one or more organopolysiloxanes containing $R_3SiO_{1/2}$, $R_2SiO_{2/2}$, $RSiO_{3/2}$, and $SiO_{4/2}$ moieties, wherein $R_3$ is a $C_{1-18}$ substituted or unsubstituted hydrocarbon radical optionally interspersed with oxygen atoms, or a functional group selected from hydroxyl, hydrogen, $C_{1-8}$ alkoxy, mercaptoalkyl, and aminoalkyl, about 60 weight percent or more of the organopolysiloxanes of said organopolysiloxane component being liquid at 25° C.

3. The process of claim 1 wherein said multiple release additive comprises an organic thickening agent.

4. The process of claim 3 wherein said organic thickening agent is a vegetable gum, an alkyl-, hydroxyalkyl-, or carboxyalkyl-modified cellulose ether, or an organic polymer thickener.

5. The process of claim 4 wherein said organic polymer thickener is a polysulfonic acid polymer or copolymer or a polycarboxylic acid polymer or copolymer.

6. The process of claim 1 wherein said multiple release additive is a polyacrylate polymer or copolymer thickener.

7. The process of claim 6 wherein said multiple release additive is present in an amount of from about 0.01 to about 0.5 weight percent.

8. The process of claim 1 wherein said aqueous asphalt release coating emulsion has a viscosity of from about 500 cSt to about 4000 cSt.

9. The process of claim 1 wherein said organopolysiloxane component comprises a functional organopolysiloxane selected from the group consisting of aminoalkyl-functional organopolysiloxanes, mercaptoalkyl-functional organopolysiloxanes, and silanol-functional organopolysiloxanes.

10. The process of claim 1 wherein said multiple release additive comprises an inorganic thickening agent.

11. An aqueous asphalt release composition, comprising, in weight percent:
    a) from about 1 percent to about 30 percent of an organopolysiloxane component comprising a mercaptoalkyl-functional organopolysiloxane;
    b) one or more surfactants in an amount effective to from a stable emulsion of said organopolysiloxane component; and
    c) from about 0.01 percent to about 10 percent of a multiple release additive.

12. The release composition of claim 11 wherein said multiple release additive comprises an inorganic or organic thickening agent or mixture thereof.

13. The release composition of claim 11 wherein said multiple release additive comprises one or more of a vegetable gum, an alkyl-, hydroxyalkyl-, or carboxyalkyl-modified cellulose ether, or an organic polymer containing hydrophillic moieties.

14. The release composition of claim 11 wherein said multiple release additive comprises an organic polymer containing moieties derived from an unsaturated carboxylic acid or derivative thereof.

15. The release composition of claim 11 wherein said multiple release additive comprises from about 0.01 percent to about 0.5 percent of a polyacrylate thickener.

16. An aqueous asphalt release composition, comprising, in weight percent:
    a) from about 5 to about 30 percent of an organopolysiloxane component;
    b) an amount of one or more surfactants effective to form a stable aqueous emulsion of said organopolysiloxane component; and
    c) from about 0.01 percent to about 10 percent of a multiple release additive.

17. The release composition of claim 16 wherein said organopolysiloxane component comprises one or more organopolysiloxanes containing $R_3SiO_{1/2}$, $R_2SiO_{2/2}$, $RSiO_{3/2}$, and $SiO_{4/2}$ moieties, wherein $R_3$ is a $C_{1-18}$ substituted or unsubstituted hydrocarbon radical optionally interspersed with oxygen atoms, or a functional group selected from hydroxyl, hydrogen, $C_{1-8}$ alkoxy, mercaptoalkyl, and aminoalkyl, at least 60 weight percent of the organopolysiloxanes of said organopolysiloxane component being liquid at 25° C.

18. The release composition of claim 16 wherein said multiple release additive comprises an inorganic or organic thickening agent or mixture thereof.

19. The release composition of claim 16 wherein said multiple release additive comprises one or more of a vegetable gum, an alkyl-, hydroxyalkyl-, or carboxyalkyl-modified cellulose ether, or an organic polymer containing hydrophillic moieties.

20. The release composition of claim 16 wherein said multiple release additive comprises an organic polymer containing moieties derived from an unsaturated carboxylic acid or derivative thereof.

21. The release composition of claim 16 wherein said multiple release additive comprises from about 0.01 percent to about 0.5 percent of a polyacrylate thickener.

22. The release composition of claim 16 wherein said organopolysiloxane component comprises a trimethylsilyl-terminated polydimethylsiloxane fluid, and one or more organopolysiloxanes selected from the group consisting of organopolysiloxane resins, mercaptoalkyl-functional organopolysiloxanes, aminoalkyl-functional organopolysiloxanes, and silanol-functional organopolysiloxanes.

23. The release composition of claim 22 wherein the majority of organo groups of said organopolysiloxane resins, mercapto-functional organopolysiloxanes, aminoalkyl-functional organopolysiloxanes, and silanol-functional organopolysiloxanes are methyl groups.

24. A concentrate suitable for the preparation of the composition of claim 16 by n-fold dilution with a water-containing diluent, said concentration containing:
    a) from 5·n to 30·n percent organopolysiloxane component;
    b) an amount of one or more surfactants sufficient to form a stable emulsion of organopolysiloxane a) after n-fold dilution with a water-containing diluent; and
    c) from 0.03 to about 30 weight percent of a multiple release additive;
    wherein the total organopolysiloxane content is about 60 weight percent or less of the weight of said concentrate.

25. An aqueous asphalt release composition, comprising, in weight percent:
    a) from about 1 percent to about 30 percent of an organopolysiloxane component comprising a mercaptoalkyl-functional organopolysiloxane;
    b) one or more surfactants in an amount effective to from a stable emulsion of said organopolysiloxane component; and
    c) from about 0.01 percent to about 10 percent of a multiple release additive;
    wherein said emulsion is free of volatile organic solvents.

26. The release composition of claim 25 wherein said multiple release additive comprises an inorganic or organic thickening agent or mixture thereof.

27. The release composition of claim 25 wherein said multiple release additive comprises one or more of a vegetable gum, an alkyl-, hydroxyalkyl-, or carboxyalkyl-modified cellulose ether, or an organic polymer containing hydrophillic moieties.

28. The release composition of claim 25 wherein said multiple release additive comprises an organic polymer containing moieties derived from an unsaturated carboxylic acid or derivative thereof.

29. The composition of claim 25 wherein said multiple release additive comprises a polycarboxylic acid thickener.

30. The composition of claim 29 wherein said polycarboxylic acid thickener comprises polyacrylic acid.

31. The composition of claim 1 wherein said multiple release additive comprises a polycarboxylic acid thickener.

32. The composition of claim 31 wherein said polycarboxylic acid thickener comprises polyacrylic acid.

33. A process for the release of asphalt from a surface, said process comprising:

a) applying to said surface the composition of claim 11 to form a release coated surface;

b) contacting said release coated surface with hot asphalt; and c) removing asphalt from said surface.

\* \* \* \* \*

UNITED STATES PATENT AND TRADEMARK OFFICE
CERTIFICATE OF CORRECTION

PATENT NO. : 6,143,812
DATED : November 7, 2000
INVENTOR(S) : Eugene R. Martin et al.

Page 1 of 1

It is certified that error appears in the above-identified patent and that said Letters Patent is hereby corrected as shown below:

Column 13,
Line 33, delete "from" and insert -- form --.

Column 14,
Line 56, delete "from" and insert -- form --.

Signed and Sealed this

Seventh Day of May, 2002

Attest:

Attesting Officer

JAMES E. ROGAN
Director of the United States Patent and Trademark Office